(12) United States Patent
Tung et al.

(10) Patent No.: US 9,617,174 B2
(45) Date of Patent: Apr. 11, 2017

(54) HYDROPHOBIC POROUS SILICA AEROGEL COMPOSITE MEMBRANE AND VACUUM MEMBRANE DISTILLATION METHOD

(71) Applicant: National Taiwan University, Taipei (TW)

(72) Inventors: Kuo-Lun Tung, Taipei (TW);
Chung-Chin Yang, Taipei (TW);
Chia-Chieh Ko, Taipei (TW);
Chien-Hua Chen, Taipei (TW);
Yi-Feng Lin, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 14/844,879

(22) Filed: Sep. 3, 2015

(65) Prior Publication Data
US 2016/0257581 A1   Sep. 8, 2016

(30) Foreign Application Priority Data
Mar. 3, 2015   (TW) .............................. 104106696 A

(51) Int. Cl.
*B01D 15/00*   (2006.01)
*C02F 1/44*   (2006.01)
(Continued)

(52) U.S. Cl.
CPC ............ *C02F 1/447* (2013.01); *B01D 61/364* (2013.01); *B01D 67/0048* (2013.01);
(Continued)

(58) Field of Classification Search
CPC .. B01D 53/228; B01D 67/0048; B01D 69/12; B01D 71/025; B01D 71/027; C25F 7/00
See application file for complete search history.

(56) References Cited

U.S. PATENT DOCUMENTS 5,276,244 A * 1/1994 Lin ..................... B01D 61/02
                                              210/644
6,890,416 B1 * 5/2005 Mayer .................. C25D 21/12
                                              205/261

(Continued)

FOREIGN PATENT DOCUMENTS

TW         201514126 A       4/2015

OTHER PUBLICATIONS

Chung-Chih Yang, "Methylmethoxysilane Derived Hydrophobics Silica Aerogel Membranes for Vacuum Membrane Distillation Applications", Deparment of Chemical Engineering College of Engineering, National Taiwan University, Master Thesis Sep. 3, 2014 (112 pages).

*Primary Examiner* — Ana Fortuna
(74) *Attorney, Agent, or Firm* — Muncy, Geissler, Olds & Lowe, P.C.

(57) ABSTRACT

A hydrophobic porous silica aerogel composite membrane for a vacuum membrane distillation device and a vacuum distillation method are disclosed. The vacuum membrane distillation device has a case and the hydrophobic porous silica aerogel composite membrane accommodated in the case to divide a chamber defined by the case into a feed part configured to feed a first fluid containing water molecules and a permeate part configured to collect a second fluid containing the water molecules. The hydrophobic porous silica aerogel composite membrane includes a porous aluminum oxide membrane that has a plurality of first pores with average pore diameter larger than 50 nm and a porous silica aerogel membrane that has a plurality of second pores of 2 to 50 nm and is formed on at least one side of the porous aluminum oxide membrane facing the feed part by methylmethoxysilane as a precursor and a sol-gel synthetic process.

5 Claims, 7 Drawing Sheets

(51) Int. Cl.
  *B01D 39/00*  (2006.01)
  *B01D 71/02*  (2006.01)
  *B01D 61/36*  (2006.01)
  *B01D 67/00*  (2006.01)
  *B01D 69/10*  (2006.01)
  *B01D 69/14*  (2006.01)
  *C02F 103/08* (2006.01)

(52) U.S. Cl.
  CPC ........... *B01D 69/10* (2013.01); *B01D 69/141* (2013.01); *B01D 71/025* (2013.01); *B01D 71/027* (2013.01); *B01D 2325/04* (2013.01); *B01D 2325/38* (2013.01); *C02F 2103/08* (2013.01); *C02F 2301/063* (2013.01); *Y02W 10/37* (2015.05)

(56) References Cited

U.S. PATENT DOCUMENTS

| | | | |
|---|---|---|---|
| 6,899,743 B2 * | 5/2005 | Wijmans | B01D 3/145 210/640 |
| 7,510,598 B2 * | 3/2009 | Suzuki | B01D 53/22 427/244 |
| 2014/0056722 A1 * | 2/2014 | Kugimoto | F04B 19/006 417/51 |
| 2015/0104357 A1 * | 4/2015 | Lin | B01D 67/0048 422/187 |
| 2016/0074831 A1 * | 3/2016 | Begag | B01J 20/3085 556/424 |

* cited by examiner

HYDROPHOBIC POROUS SILICA AEROGEL COMPOSITE MEMBRANE AND VACUUM MEMBRANE DISTILLATION METHOD

CROSS REFERENCE TO RELATED APPLICATIONS

This Non-provisional application claims priority under 35 U.S.C. §119(a) on Patent Application No(s). 104106696 filed in Taiwan, Republic of China on Mar. 3, 2015, the entire contents of which are hereby incorporated by reference.

BACKGROUND OF THE INVENTION

Field of Invention

The present invention relates to a composite membrane and distillation method and, in particular, to a composite membrane adapted for a vacuum membrane distillation device and a vacuum membrane distillation method using such a composite membrane.

Related Art

Lack of water resource is currently a worldwide problem. To solve this problem, numerous techniques about wastewater recycling and seawater desalination have been developed. Among these techniques, the distillation process including multi-stage flash distillation (MSF), multiple-effect distillation (MED) and vapor-compression (VC) and the membrane process are specially developed. Advantages of the distillation process include the high energy utilization rate and the capability of using waste heat generated by production lines of factories as energy. However, it still has a disadvantage of huge equipment. The membrane process using a semipermeable membrane may efficiently remove the impurities from the water, but it requires huge energy to overcome the osmotic pressure resulting in that the water can pass through the semipermeable membrane. Therefore, the cost of electricity is relatively high.

In order to overcome the disadvantages of the distillation process and the membrane process described above, the membrane distillation (MD) combining the distillation process and the membrane process has been developed. Its equipment is relatively small and capable of using solar energy or waste heat as energy, and it also maintains fine purification result.

In addition, the membrane distillation process can be classified into direct contact membrane distillation (DCMD), air-gap membrane distillation (AGMD), sweeping-gas membrane distillation (SGMD), and vacuum membrane distillation (VMD). Among these processes the vacuum membrane distillation has relatively low mass transfer resistance and excellent water flux.

However, the vacuum membrane distillation still has some problems. Because the basic principle of the membrane distillation process to separate the solute from the solvent is that a liquid/gas interface needs to reach the liquid vapor equilibrium, the membrane should not be wetted. Therefore, the pore diameter of the membrane should be small enough and the membrane should be highly hydrophobic, so that higher surface tension exists between the membrane and liquid. Hence, material and hydrophobicity of the membrane both influence the efficiency of the vacuum membrane distillation process.

Therefore, it is an important subject in the field to provide a membrane adapted for a vacuum membrane distillation device and having high hydrophobicity.

SUMMARY OF THE INVENTION

In view of the deficiencies of the prior art, the inventors have developed present invention. The object of the present invention is to provide a hydrophobic porous silica aerogel composite membrane adapted for a vacuum membrane distillation device and a vacuum membrane distillation method. The porous silica aerogel composite membrane has high hydrophobicity, and using this hydrophobic porous silica aerogel composite membrane does not increase the operating cost of the membrane distillation either.

The present invention provides a hydrophobic porous silica aerogel composite membrane adapted for a vacuum membrane distillation device. The vacuum membrane distillation device has a case and the hydrophobic porous silica aerogel composite membrane. The case defines a chamber. The hydrophobic porous silica aerogel composite membrane is accommodated in the case to divide the chamber into a feed part and a permeate part. The feed part is configured to feed a first fluid containing water molecules, and the permeate part is configured to collect a second fluid containing the water molecules. The hydrophobic porous silica aerogel composite membrane includes a porous aluminum oxide membrane and a porous silica aerogel membrane. The porous aluminum oxide membrane has a plurality of first pores, and the average pore diameter of the first pores is larger than 50 nm. The porous silica aerogel membrane is formed on at least one side of the porous aluminum oxide membrane and has a plurality of second pores, and the average pore diameter of the second pores is 2 to 50 nm. Moreover, the porous silica aerogel membrane is formed by methylmethoxysilane as a precursor and a sol-gel synthetic process.

In one embodiment, the porous silica aerogel membrane is further formed in the first pores of the porous aluminum oxide membrane.

In one embodiment, the average pore diameter of the porous silica aerogel membrane is 6 to 10 nm.

In one embodiment, the water contact angle of the porous silica aerogel membrane is 137° to 147°.

In one embodiment, the thickness of the porous silica aerogel membrane is 40 to 50 nm.

The present invention also provides a vacuum membrane distillation method including providing a vacuum membrane distillation device having a case and a hydrophobic porous silica aerogel composite membrane. The case defines a chamber. The hydrophobic porous silica aerogel composite membrane is accommodated in the case to divide the chamber into a feed part and a permeate part. The hydrophobic porous silica aerogel composite membrane includes a porous aluminum oxide membrane and a porous silica aerogel membrane. The porous aluminum oxide membrane has a plurality of first pores, and the average pore diameter of the first pores is larger than 50 nm. The porous silica aerogel membrane is formed on one side of the porous aluminum oxide membrane facing the feed part and has a plurality of second pores, and the average pore diameter of the second pores is 2 to 50 nm. Moreover, the porous silica aerogel membrane is formed by methylmethoxysilane as a precursor and a sol-gel synthetic process. The vacuum membrane distillation method also includes feeding a first fluid containing water molecules in the feed part and evacuating the permeate part to collect a second fluid containing the water molecules.

In one embodiment, the first fluid is in the liquid phase and the second fluid is in the gas phase, and the temperature of the first fluid is higher than that of the second fluid.

Thereby, the water molecules are transferred and passed through the hydrophobic porous silica aerogel composite membrane from the first fluid in the feed part into the permeate part.

In one embodiment, the temperature of the first fluid is 70° C. to 300° C.

In one embodiment, the pressure of the permeate part is −98 to −70 kPa.

In one embodiment, the salt rejection rate of the second fluid is higher than 99%.

In summary, according to the hydrophobic porous silica aerogel composite membrane and the vacuum membrane distillation method of the present invention, the hydrophobic porous silica aerogel composite membrane has the porous silica aerogel membrane formed by methylmethoxysilane as a precursor and the sol-gel synthetic process. The pore shrinkage process and the hydrophobic modification of the porous substrate are complete simultaneously, and thereby the hydrophobic porous silica aerogel composite membrane has high hydrophobicity and is not like the traditional polymer membrane whose permeate flux decreases due to the swelling effect in a long-term use. Therefore, the operating cost of membrane distillation can be decreased.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
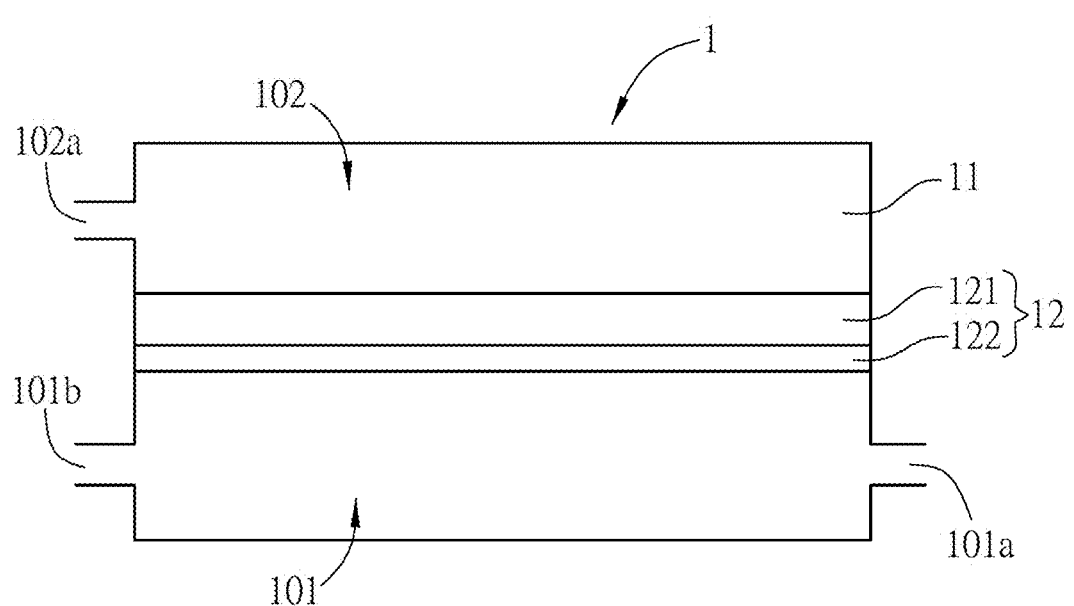
FIG. 1A is a schematic diagram showing the vacuum membrane distillation device of the preferred embodiment of the present invention.
Figure 1B:
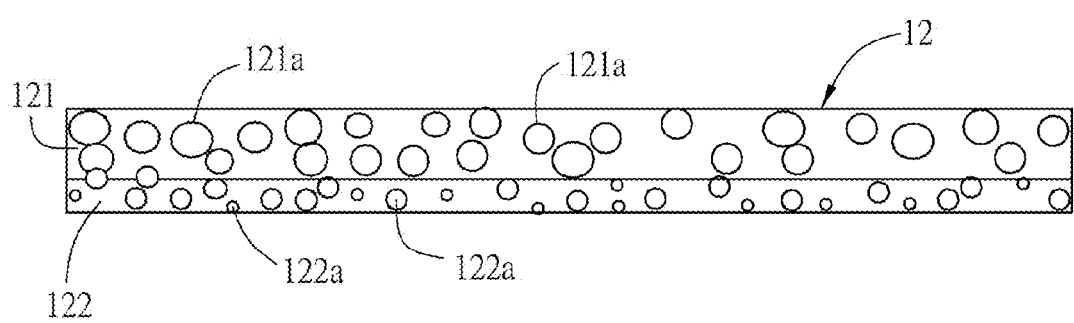
FIG. 1B is a schematic diagram showing the hydrophobic porous silica aerogel composite membrane used for the vacuum membrane distillation device shown in FIG. 1A.

First, the present invention provides a preferred embodiment that a hydrophobic porous silica aerogel composite membrane is adapted for a vacuum membrane distillation device. Referring to FIGS. 1A and 1B, FIG. 1A is a schematic diagram showing the vacuum membrane distillation device of the preferred embodiment of the present invention, and FIG. 1B is a schematic diagram showing the hydrophobic porous silica aerogel composite membrane 12 used for the vacuum membrane distillation device shown in FIG. 1A. The vacuum membrane distillation device 1 includes the case 11 and the hydrophobic porous silica aerogel composite membrane 12. The case 11 defines the chamber. The hydrophobic porous silica aerogel composite membrane 12 is accommodated in the case 11 to divide the chamber into the feed part 101 and the permeate part 102. The inlet 101a and the outlet 101b are disposed at the feed part 101. The first fluid containing water molecules enters via the inlet 101a and passes through the feed part 101 of the vacuum membrane distillation device 1, and then it is subsequently discharged via the outlet 101b. The suction opening 102a is disposed at the permeate part 102.

The hydrophobic porous silica aerogel composite membrane 12 includes the porous aluminum oxide membrane 121 and the porous silica aerogel membrane 122. The porous aluminum oxide membrane 121 has a plurality of first pores 121a which are macro pores whose average pore diameter is larger than 50 nm. The porous silica aerogel membrane 122 is formed on at least one side of the porous aluminum oxide membrane 121 facing the feed part 101. Thereby, the hydrophobic porous silica aerogel membrane 122 can be formed on one side or two opposite sides of the porous aluminum oxide membrane 121.

The porous silica aerogel membrane 122 has a plurality of second pores 122a which are meso pores whose average pore diameter is 2 to 50 nm. The porous silica aerogel membrane 122 is formed by methylmethoxysilane (MTMS) as a precursor and a sol-gel synthetic process. In other embodiments, the porous silica aerogel membrane 122 can be also formed on both sides of the porous aluminum oxide membrane 121 facing the feed part 101 and the permeate part 102 to further improve the hydrophobicity of the hydrophobic porous silica aerogel composite membrane 12, thus extending the lifespan of the hydrophobic porous silica aerogel composite membrane 12. Also, the porous silica aerogel membrane 122 in this embodiment can be further formed in the first pores 121a on the lateral side of the porous aluminum oxide membrane 121 facing the feed part 101. Besides, the average pore diameter of the porous silica aerogel membrane 122 in this embodiment is preferably 6 to 10 nm, its water contact angle is preferably 137° to 147°, and its thickness is preferably 40 to 50 μm. In this embodiment, the porous aluminum oxide membrane 121 has excellent mechanical strength, and forming the porous silica aerogel membrane 122 on the porous aluminum oxide membrane 121 results in that the pore shrinkage and the hydrophobic modification of the porous aluminum oxide membrane 121 are complete simultaneously, so that the hydrophobic porous silica aerogel composite membrane 12 has excellent hydrophobicity. Because the porous silica aerogel membrane 122 in this embodiment is produced by methylmethoxysilane as a precursor, the hydrophobic porous silica aerogel composite membrane 12 and the contained porous silica aerogel membrane 122 thereof are also known as the hydrophobic polymethylsilsesquioxane aerogel composite membrane and the hydrophobic polymethylsilsesquioxane aerogel membrane.

During practical use, a vacuum pump (not shown in the drawings) is connected to the suction opening 102a via a tube, so that the vacuum pump communicates with the permeate part 102 of the vacuum membrane distillation device 1. After the vacuum pump is turned on, it evacuates the permeate part 102, so that the pressure difference is produced between two sides (i.e. two sides respectively facing the permeate part 102 and the feed part 101) of the hydrophobic porous silica aerogel composite membrane 12.

The temperature of the first fluid containing the water molecules is higher than that of the second fluid in the permeate part 102. In other words, when feeding, the first fluid can be heated by a heater (not shown in the drawings) before it enters the inlet 101a, or the first fluid is a relatively high temperature fluid itself (for example the industrial waste fluid discharged from the factory), so that the temperature difference is produced between two sides (i.e. two sides respectively facing the permeate part 102 and the feed part 101) of the hydrophobic porous silica aerogel composite membrane 12. Therefore, because the pressure difference and the temperature difference are produced between two sides (i.e. two sides respectively facing the permeate part 102 and the feed part 101) of the hydrophobic porous silica aerogel composite membrane 12, the water molecules of the first fluid originally in the feed part 101 are driven by the pressure difference and the temperature difference between the two sides of the hydrophobic porous silica aerogel composite membrane 12 to pass through the porous aluminum oxide membrane 121 and the porous silica aerogel membrane 122 in the gas phase (i.e. vapor). Moreover, after the gaseous water molecules enter the permeate part 102, they are drawn by the vacuum established by the vacuum pump in the permeate part 102 and pass through the suction opening 102a together with the second fluid in the permeate part 102. Thereby, the second fluid containing the gaseous water molecules is collected.

Figure 2:
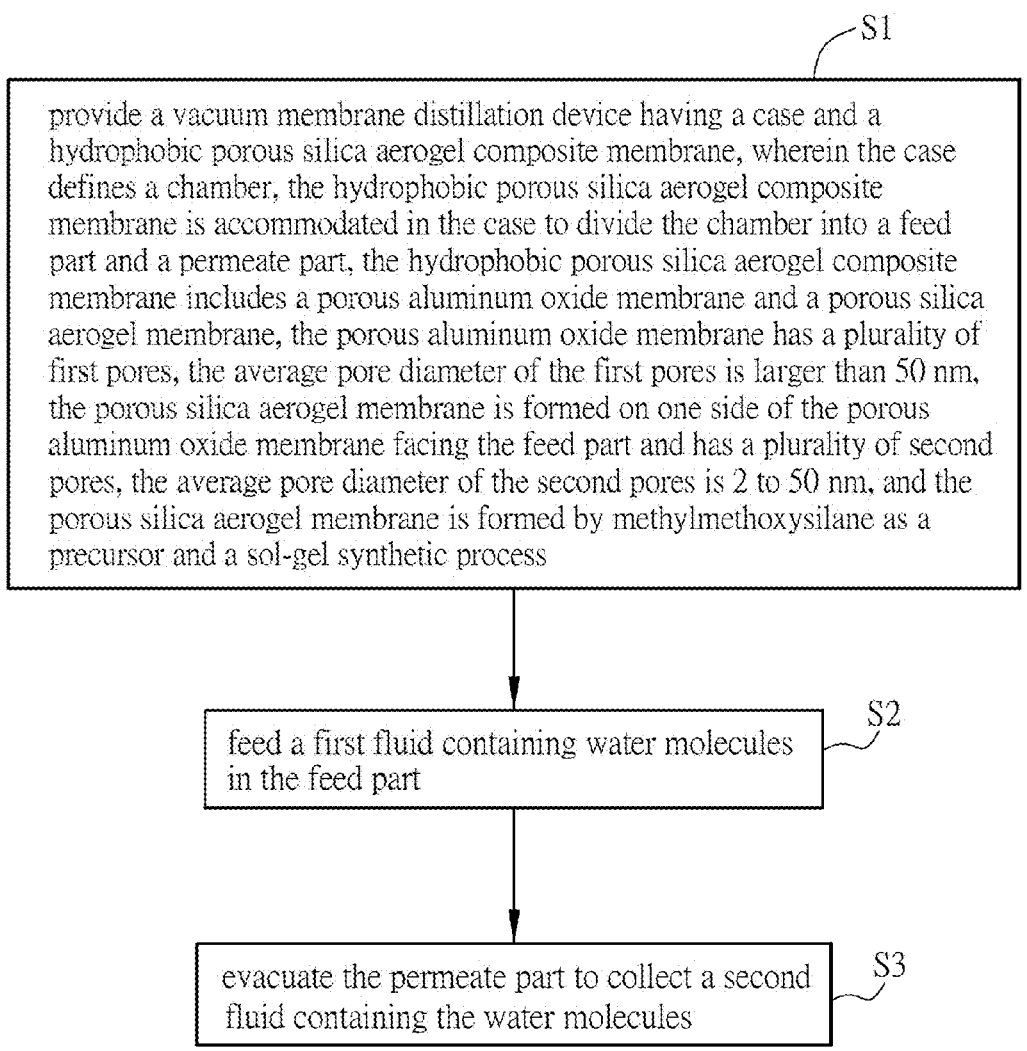
FIG. 2 is a schematic process diagram showing the vacuum membrane distillation method of the preferred embodiment of the present invention.

In addition to the vacuum membrane distillation device of the preferred embodiment described above, the present invention also provides another preferred embodiment which is a vacuum membrane distillation method. Referring to FIG. 2, it is a schematic process diagram showing the vacuum membrane distillation method of the preferred embodiment of the present invention. The vacuum membrane distillation method includes the following steps. In the step S1: the vacuum membrane distillation device 1 as shown in FIG. 1 is provided. The vacuum membrane distillation device 1 includes the case 11 and the hydrophobic porous silica aerogel composite membrane 12. The case 11 defines a chamber. The hydrophobic porous silica aerogel composite membrane 12 is accommodated in the case 11 to divide the chamber into the feed part 101 and the permeate part 102. The hydrophobic porous silica aerogel composite membrane 12 includes the porous aluminum oxide membrane 121 and the porous silica aerogel membrane 122. The porous aluminum oxide membrane 121 has a plurality of macro pores (i.e. the first pores 121a) whose average pore diameter is larger than 50 nm. The porous silica aerogel membrane 122 is formed on one side of the porous aluminum oxide membrane 121 facing the feed part 101. The porous silica aerogel membrane 122 has a plurality of meso pores (i.e. the second pores 122a) whose average pore diameter is 2 to 50 nm, and the porous silica aerogel membrane 122 is formed by methylmethoxysilane (MTMS) as a precursor and a sol-gel synthetic process. The vacuum membrane distillation device 1 used in the present embodiment, and its element composition and the connection between respective elements and the variation are identical to those in the preferred embodiment described above and they are not repeated again.

In the step S2: the feed part 101 is fed with the first fluid containing the water molecules. Besides, the temperature of the first fluid containing the water molecules is higher than that of the second fluid in the permeate part 102 in the present embodiment. In other words, when feeding, the first fluid can be heated by a heater (not shown in the drawings) before it enters the inlet 101a, or the first fluid is a relatively high temperature fluid itself (for example the industrial waste fluid discharged from the factory), so that the temperature difference is produced between two sides (i.e. two sides respectively facing the permeate part 102 and the feed part 101) of the hydrophobic porous silica aerogel composite membrane 12. In the present embodiment, the temperature of the first fluid is preferably 70° C. to 300° C. and more preferably 70° C. to 75° C.

In the step S3: the permeate part 102 is evacuated to collect the second fluid containing the water molecules. During practical use, a vacuum pump is connected to the suction opening 102a via a tube, so that the vacuum pump communicates with the permeate part 102 of the vacuum membrane distillation device 1. Therefore, after the vacuum pump is turned on, it evacuates the permeate part 102, so that the pressure difference is produced between two sides (i.e. two sides respectively facing the permeate part 102 and the feed part 101) of the hydrophobic porous silica aerogel composite membrane 12. In the embodiment, after the vacuum pump is turned on, the pressure of the permeate part is preferably −98 to −70 kPa.

Therefore, because the pressure difference and the temperature difference are produced between two sides (i.e. two sides respectively facing the permeate part 102 and the feed part 101) of the hydrophobic porous silica aerogel composite membrane 12, the water molecules of the first fluid originally in the feed part 101 are driven by the pressure difference and the temperature difference between two sides of the hydrophobic porous silica aerogel composite membrane 12 to pass through the porous aluminum oxide membrane 121 and the porous silica aerogel membrane 122 in the gas phase (i.e. vapor). Moreover, after the gaseous water molecules enter the permeate part 102, they are drawn by the vacuum established by the vacuum pump in the permeate part 102 and pass through the suction opening 102a together with the second fluid in the permeate part 102. Thereby the second fluid containing the gaseous water molecules is collected. In the embodiment, the salt rejection rate of the second fluid processed by the vacuum membrane distillation method described above is preferably higher than 99% and more preferably higher than 99.5%.

Several experimental examples according to the experiments of the preferred embodiments described above will be proceeded with further description.

Experimental Example 1

Preparing a Hydrophobic Porous Silica Aerogel Membrane

First, the sol of the aerogel is prepared. Methylmethoxysilane (MTMS, with a molecular weight of 136.22 and a purity of 97%, purchased from Alfa Aesar, A Johnson Matthey Company) as a precursor, ethanol (EtOH, with a molecular weight of 46.1 and a purity of 99.5%, purchased from Echo chemical co., LTD.), hydrochloric acid (with a molecular weight of 36.5, purchased from Fisher Scientific) as a catalyst, and water are mixed in a specific molar ratio (for example $1:3:6.29\times10^{-4}:1$) and continuously stirred at room temperature (about 25° C.) for 90 minutes for hydrolysis. A solution including ethanol (hereinafter referred to as $EtOH_{2nd}$) and ammonium hydroxide (as a base catalyst and purchased from Fisher Scientific) is then added into the foresaid solution to mix (for example, the molar ratio of MTMS/ammonium hydroxide/water in the mixed solution may be 1:0.223:2.12) and be continuously stirred at room temperature for 30 minutes for the condensation reaction.

After well mixed, the foresaid solution becomes the needed sol of the aerogel. To prepare the aerogel sol by the different weight percentage concentration of hydrochloric acid, the different concentration of ammonium hydroxide, and the different additive amount of ethanol used in the condensation reaction, the amount of hydrochloric acid and ammonium hydroxide used in the above steps and the additive amount of ethanol used in the condensation reaction may be appropriately adjusted. Specifically, for example, to prepare the sol of the aerogel having hydrochloric acid whose final weight percentage concentration in the sol of the aerogel is 0.14% and ammonium hydroxide whose final weight percentage concentration in the sol of the aerogel is 17%, 2.04 g methylmethoxysilane (precursor), 2.07 g ethanol, and 0.27 g hydrochloric acid are mixed in a wide mouth container and continuously stirred at room temperature for 90 minutes. Then, 0.69 g ethanol ($EtOH_{2nd}$) and 0.69 g ammonium hydroxide are added into the foresaid solution and then continuously stirred at room temperature for 30 minutes for the condensation reaction. After the foresaid solution is well mixed, the needed aerogel sol is prepared Next, all or at least one side of the porous aluminum oxide membrane (the model number is WA 1500 K 10V 2WF, the thickness is 2.4 mm, the diameter is 47 mm, and the average pore diameter is 1 to 1.2 μm) purchased from Kinik company is immersed in the aerogel sol prepared by the foresaid steps for a period of time (preferably about 24 hours) for the coating and the gelation processes, so that the membrane having the aerogel prepared by the foresaid steps is formed on the surface of one side and/or on two opposite sides of the porous aluminum oxide membrane. It is preferable to remain airtight in this step in order to avoid the structural variation of the membrane due to the volatilization of the ethanol solvent in the process. Then performing the aging process, the membrane having the gel on its surface is immersed in ethanol for a predetermined aging time (about 48 hours, replacement of ethanol every 24 hours) to form the composite membrane in order to enhance the porous structure of the membrane and simultaneously remove unreacted chemicals in the foresaid reaction steps and impurities remaining in the gel. Subsequently performing solvent exchange process, the aged composite membrane is immersed in N-hexane (purchased from Echo chemical co., LTD.) for a predetermined solvent exchange time (preferably about 24 hours). Finally, performing the drying process, the composite membrane obtained from the foresaid steps is dried at room temperature (about 25° C.) under atmospheric pressure for a period of time (preferably about 24 hours) to obtain a hydrophobic porous silica aerogel composite membrane that the porous aluminum oxide membrane is coated by the porous silica aerogel membrane.

Experimental Example 2

Characteristics Analysis of Hydrophobic Porous Silica Aerogel Composite Membrane With regard to the hydrophobic porous silica aerogel composite membrane prepared in the previous experimental example, its hydrophobicity is analyzed by a water contact angle goniometer (First Tech Angstroms FTA125 Goniometer). Its specific surface area, pore volume, and average pore diameter distribution are analyzed by a BET Specific Surface Area & Pore Size Distribution Analyzer by Gas Adsorption Method (Micromeritics, ASAP2010). Its surface structure is simultaneously observed by a scanning electron microscope (FEI company, Nova NanoSEM 230 Ultra-High Resolution Field Emission SEM).

Because the hydrophobic porous silica aerogel composite membrane obtained in the previous experimental example is formed by methylmethoxysilane (MTMS) as a precursor and the total amount of water in hydrolysis and the condensation reaction are fixed, after analyzing, it is found that the water contact angle of the hydrophobic porous silica aerogel composite membrane obtained in the previous experimental example changes with the additive amount of ethanol ($EtOH_{2m}$) added in the condensation reaction, the concentration of used ammonium hydroxide, and the concentration of used hydrochloric acid. The results show that the range of the weight percentage concentration of ammonium hydroxide used in the process may be preferably 17 to 25%, the range of the weight percentage concentration of hydrochloric acid used may be preferably 0.14 to 17.92% and more preferably 0.56 to 0.84%, and the range of the molar ratio of ethanol used in the condensation reaction to MTMS ($EtOH_{2nd}$/MTMS) may be preferably 2 to 0.5 and more preferably 1. Moreover, the average pore diameter of the hydrophobic porous silica aerogel composite membrane obtained in the previous experimental example may be between 2 and 50 nm and preferably between 6 and 10 nm, and the water contact angle may be larger than 135° and preferably between 137° and 147°. Therefore, in the process of preparing the hydrophobic porous silica aerogel composite membrane in the previous experimental example, the pore shrinkage process and the hydrophobic modification of the porous aluminum oxide membrane are completed simultaneously, so that the prepared hydrophobic porous silica aerogel composite membrane has high hydrophobicity.

Figure 3:
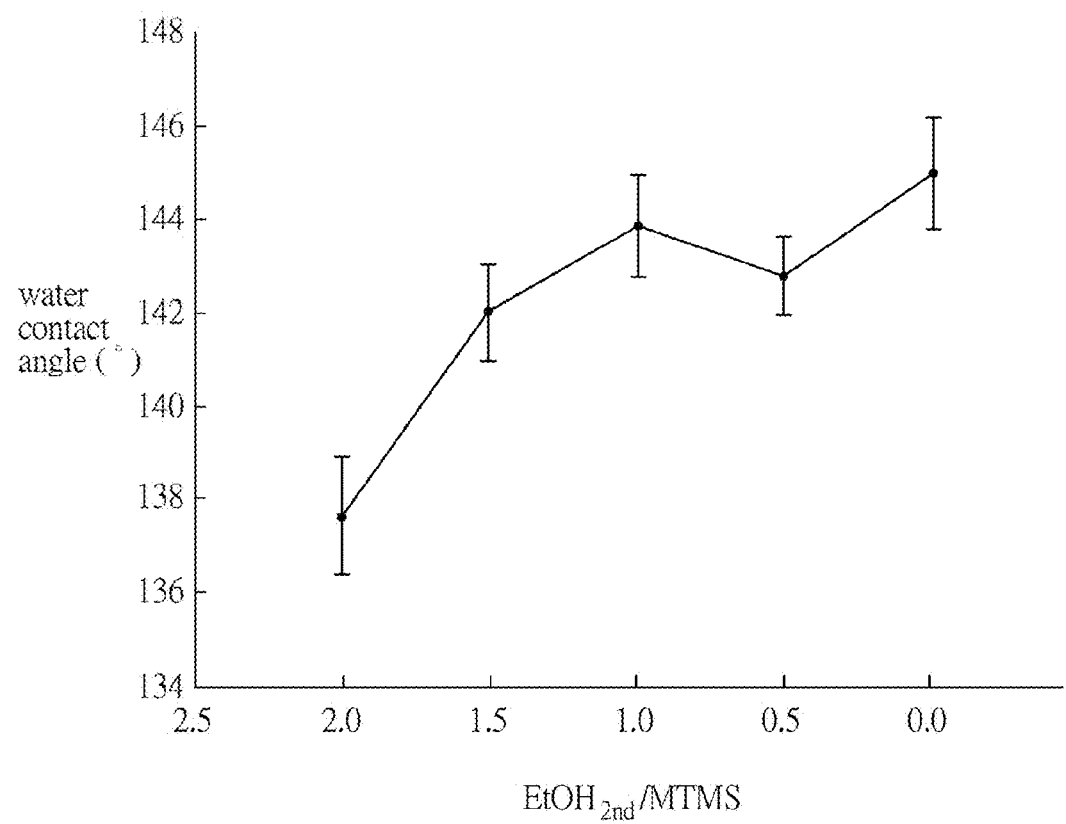
FIG. 3 is a diagram showing the experimental results of the water contact angle of the hydrophobic porous silica aerogel composite membrane of experimental example 2.
Figure 4:
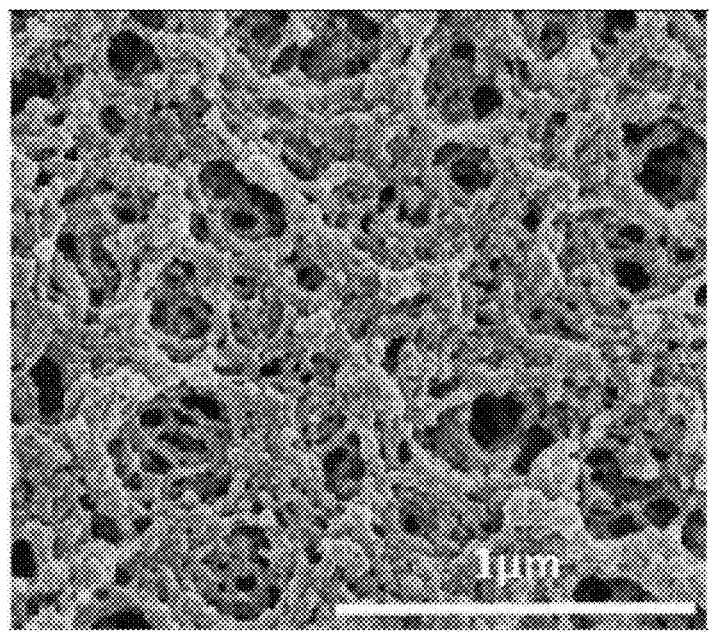
FIG. 4 is a photomicrograph showing the surface structure of the hydrophobic porous silica aerogel composite membrane of experimental example 2.

These results can refer to FIG. 3, FIG. 4, and Table 1. FIG. 3 is a diagram showing the experimental results of the water contact angle of the hydrophobic porous silica aerogel composite membrane prepared by using 0.14% weight percentage concentration of hydrochloric acid, 17% weight percentage concentration of ammonium hydroxide, and the different $EtOH_{2nd}$/MTMS molar ratio. FIG. 4 is a photomicrograph showing the surface structure of the hydrophobic porous silica aerogel composite membrane (prepared by using 0.14% weight percentage concentration of hydrochloric acid, 17% weight percentage concentration of ammonium hydroxide, and the $EtOH_{2nd}$/MTMS molar ratio of 1) observed under a scanning electron microscope at 90,000× magnification. Table 1 is the specific surface area (BET surface area, m$^2$/g), the average pore diameter (nm), and average pore volume (cm$^3$/g) of the hydrophobic porous silica aerogel composite membrane prepared by the different concentration of ammonium hydroxide, the different concentration of hydrochloric acid, and the different additive amount of ethanol ($EtOH_{2nd}$) added in the condensation reaction. The above results show that the porous silica aerogel composite membrane may remain high hydrophobicity (the water contact angle is about 143°) and have better degree of surface coverage when the $EtOH_{2nd}$/MTMS molar ratio is 1.

TABLE 1 the specific surface area, the average pore diameter, and the average pore volume of the hydrophobic porous silica aerogel composite membrane prepared by the different concentration of ammonium hydroxide, the different concentration of hydrochloric acid, and the different EtOH2nd/MTMS molar ratio.

| $EtOH_{2nd}$/MTMS | 2 | 1 | 0.5 | 0 | 1 | 1 | 1 | 1 | 1 |
|---|---|---|---|---|---|---|---|---|---|
| HCl/$NH_4OH$ | 0.14%/17% | 0.14%/17% | 0.14%/17% | 0.14%/17% | 0.84%/17% | 2.24%/17% | 0.14%/25% | 0.84%/25% | 2.24%/25% |
| specific surface area ($m^2$/g) | 375.69 | 370.58 | 374.91 | 374.69 | 412.04 | 268.52 | 387.63 | 368.54 | 376.65 |
| average pore diameter (nm) | 6.5 | 6.76 | 8.77 | 8.39 | 8.06 | 7.17 | 7.34 | 9.53 | 9.57 |
| average pore volume ($cm^3$/g) | 0.45 | 0.43 | 0.55 | 0.48 | 0.68 | 0.32 | 0.52 | 0.52 | 0.59 |

Then, the thermal gravity analysis of the hydrophobic porous silica aerogel composite membrane prepared in experimental example 1 is performed. It is found that the hydrophobic porous silica aerogel composite membrane prepared in experimental example 1 may have excellent thermal resistance, and it maintains stable structure within 300° C. and has excellent stability within the temperature range of performing the membrane distillation process. It proves that the hydrophobic porous silica aerogel composite membrane prepared by methylmethoxysilane as a precursor and a sol-gel synthetic process has excellent durability.

Experimental Example 3

Experiment on the Efficiency of the Vacuum Membrane Distillation

To experiment on the efficiency of the vacuum membrane distillation of the hydrophobic porous silica aerogel composite membrane prepared in experimental example 1, 3.5% simulate seawater (385 g Sodium chloride is dissolved in 11 L water) is used as a feed solution to perform the experiment, the temperature of the feed solution is controlled to maintain at about 70° C., the feed flow rate is controlled at 1 L/min, and the vacuum pressure is controlled at −98 to −70 kPa after the vacuum pump is turned on. The collected vapor is condensed by liquid nitrogen, which is followed by calculating the permeate flux. Moreover, the conductivities of the feed solution and the permeate are measured to calculate the salt rejection rate.

Figure 5:
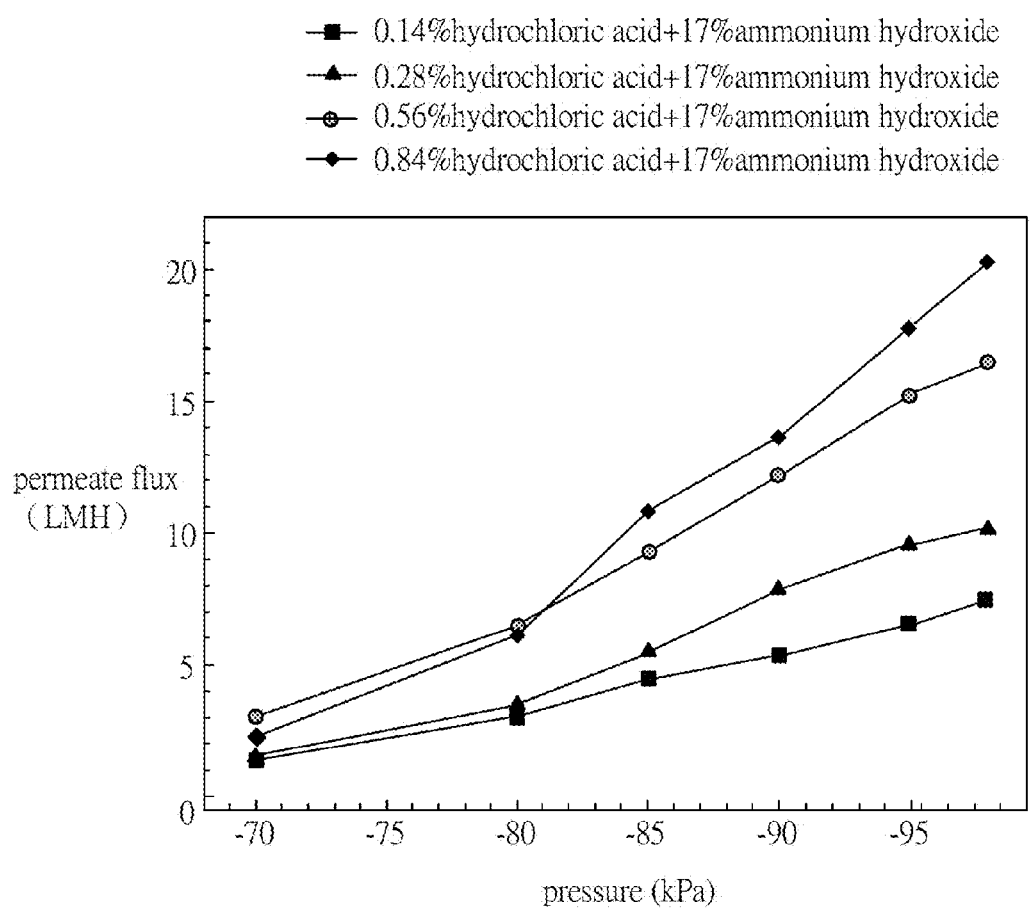
FIG. 5 is a diagram showing the experimental results of the permeate flux of the hydrophobic porous silica aerogel composite membrane of experimental example 3.
Figure 6:
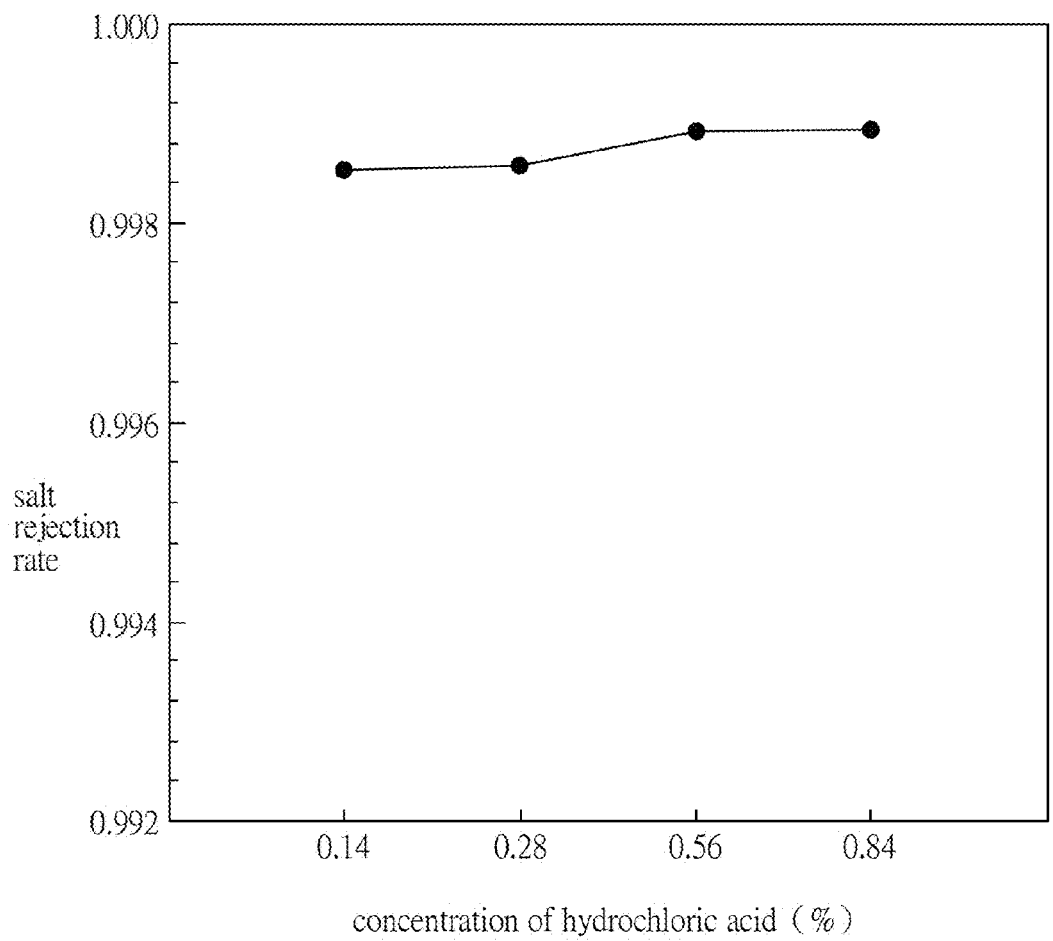
FIG. 6 is a diagram showing the experimental results of the salt rejection rate of the hydrophobic porous silica aerogel composite membrane of experimental example 3.

The experiments on the efficiency of the vacuum membrane distillation of the membrane prepared by different $EtOH_{2nd}$/MTMS molar ratio is performed, and the results show that the permeate flux is also the highest while $EtOH_{2nd}$/MTMS molar ratio is 1. It proves the excellent aerogel structure contributes to improving the efficiency of the membrane flux. After experimenting, it is found that if the weight percentage concentration of ammonium hydroxide is more than 17%, the permeate flux of the prepared hydrophobic porous silica aerogel composite membrane may slightly decrease. When the experiments on the hydrophobic porous silica aerogel composite membrane prepared by 17% weight percentage concentration of ammonium hydroxide and different weight percentage concentration (0.14% to 2.24%) of hydrochloric acid is performed, it is found that the hydrophobic porous silica aerogel composite membrane prepared by 0.84% weight percentage concentration of hydrochloric acid has the relatively excellent permeate flux and salt rejection rate. Referring to FIGS. 5 and 6, they are diagrams showing the experimental results of the permeate flux and the salt rejection rate of the hydrophobic porous silica aerogel composite membrane prepared by 0.14% to 0.84% weight percentage concentration of hydrochloric acid. As shown in figures, the permeate flux of the hydrophobic porous silica aerogel composite membrane prepared by 0.84% weight percentage concentration of hydrochloric acid may be up to 20.24 Liter/$m^2$/hour (LMH) in the condition of the present experimental example, and its salt rejection rate may be also more than 99% and even be 99.9%.

In summary, according to the hydrophobic porous silica aerogel composite membrane and the vacuum membrane distillation method of the present invention, the hydrophobic porous silica aerogel composite membrane has the porous silica aerogel membrane formed by methylmethoxysilane as a precursor and the sol-gel synthetic process. The pore shrinkage process and the hydrophobic modification of the porous substrate are complete simultaneously, and thereby the hydrophobic porous silica aerogel composite membrane has high hydrophobicity and is not like the traditional polymer membrane whose permeate flux decreases due to the swelling effect in a long-term use. Therefore, the operating cost of membrane distillation can be decreased.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A vacuum membrane distillation method, comprising:
providing a vacuum membrane distillation device having a case and a hydrophobic porous silica aerogel composite membrane accommodated in the case to divide a chamber defined by the case into a feed part and a permeate part, wherein the hydrophobic porous silica aerogel composite membrane has a porous aluminum oxide membrane and a porous silica aerogel membrane, the porous aluminum oxide membrane has a plurality of first pores, the average pore diameter of the first pores is larger than 50 nm, the porous silica aerogel membrane is formed on one side of the porous aluminum oxide membrane facing the feed part, the porous silica aerogel membrane has a plurality of second pores, the average pore diameter of the second pores is 2 to 50 nm, and the porous silica aerogel membrane is formed by methylmethoxysilane as a precursor and a sol-gel synthetic process;

feeding a first fluid containing water molecules in the feed part; and evacuating the permeate part to collect a second fluid containing the water molecules.

2. The vacuum membrane distillation method of claim 1, wherein the first fluid is in the liquid phase and the second fluid is in the gas phase, the temperature of the first fluid is higher than that of the second fluid, and thereby the water molecules are transferred and passed through the hydrophobic porous silica aerogel composite membrane from the first fluid in the feed part into the permeate part.

3. The vacuum membrane distillation method of claim 2, wherein the temperature of the first fluid is 70° C. to 300° C.

4. The vacuum membrane distillation method of claim 2, wherein the pressure of the permeate part is −98 to −70 kPa.

5. The vacuum membrane distillation method of claim 2, wherein the salt rejection rate of the second fluid is higher than 99%.

\* \* \* \* \*